US009806786B2

(12) United States Patent
Hirabayashi

(10) Patent No.: US 9,806,786 B2
(45) Date of Patent: Oct. 31, 2017

(54) COMMUNICATION DEVICE AND ANTENNA DEVICE WITH FIRST AND SECOND ANTENNAS HAVING POWER SUPPLY SECTIONS SEPARATED BY Nλ/4 ELECTRIC PATH LENGTH

(71) Applicant: Sony Corporation, Tokyo (JP)

(72) Inventor: Takayuki Hirabayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 89 days.

(21) Appl. No.: 14/097,790

(22) Filed: Dec. 5, 2013

(65) Prior Publication Data

US 2014/0162572 A1    Jun. 12, 2014

(30) Foreign Application Priority Data

Dec. 12, 2012    (JP) .................................. 2012-271217

(51) Int. Cl.
| H04B 7/06 | (2006.01) |
| H04B 7/04 | (2017.01) |
| H04B 7/08 | (2006.01) |
| H01Q 1/52 | (2006.01) |
| H01Q 9/42 | (2006.01) |
| H01Q 21/28 | (2006.01) |

(52) U.S. Cl.
CPC ........... *H04B 7/0697* (2013.01); *H01Q 1/521* (2013.01); *H01Q 9/42* (2013.01); *H01Q 21/28* (2013.01); *H04B 7/04* (2013.01); *H04B 7/08* (2013.01)

(58) Field of Classification Search
None
See application file for complete search history.

(56) References Cited

U.S. PATENT DOCUMENTS

| 2003/0174092 A1* | 9/2003 | Sullivan et al. ............... 343/702 |
| 2004/0217915 A1* | 11/2004 | Imaizumi ................. H03H 7/38 343/860 |
| 2006/0044196 A1* | 3/2006 | Grant ................... H01Q 1/3275 343/713 |
| 2007/0001911 A1* | 1/2007 | Fujio et al. ............ 343/700 MS |
| 2009/0302968 A1* | 12/2009 | Van Bezooijen .... H04B 1/0458 333/32 |
| 2010/0238072 A1* | 9/2010 | Ayatollahi ............. H01Q 1/243 343/700 MS |
| 2011/0128200 A1* | 6/2011 | Hossain et al. ............... 343/745 |
| 2013/0050027 A1* | 2/2013 | Kim et al. ............. 343/700 MS |
| 2013/0120201 A1* | 5/2013 | Park ........................ H01Q 1/48 343/749 |

FOREIGN PATENT DOCUMENTS

| JP | 2006-325178 A | 11/2006 |
| JP | 4039413 B2 | 1/2008 |
| JP | 2009-044604 A | 2/2009 |

* cited by examiner

*Primary Examiner* — Alejandro Rivero
(74) *Attorney, Agent, or Firm* — Chip Law Group

(57) ABSTRACT

There is provided an antenna device including a first antenna including a first power supply section, a first short-circuited section connected to a bottom board, and a first open-circuited section, and a second antenna including a second power supply section separated from the first power supply section by an electric path length of about nλ/4, a second short-circuited section connected to the bottom board, and a second open-circuited section.

9 Claims, 20 Drawing Sheets

COMMUNICATION DEVICE AND ANTENNA DEVICE WITH FIRST AND SECOND ANTENNAS HAVING POWER SUPPLY SECTIONS SEPARATED BY Nλ/4 ELECTRIC PATH LENGTH

CROSS REFERENCE TO RELATED APPLICATIONS

This application claims the benefit of Japanese Priority Patent Application JP 2012-271217 filed Dec. 12, 2012, the entire contents of which are incorporated herein by reference.

BACKGROUND

The present disclosure relates to an antenna device and communication device which have a plurality of antennae to provide a diversity effect or the like, and are used by being incorporated in an apparatus including a notebook computer and a mobile terminal.

In the recent trend of using networks, notebook computers, mobile terminals, such as cellular phones and smart phones, game machines, and so forth are provided with a wireless communication capability. At present, most of those types of the apparatuses are provided with, for example, the IEEE 802.11 wireless LAN (Local Area Network) capability. It is also desirable to provide a wireless communication capability which covers a metropolitan area, such as WiMAX (Wireless Metropolitan Area Network).

A monopole antenna is known as the fundamental structure of antennae used in radio communications. The monopole antenna has a monopole with a length which is a quarter of the wavelength $\lambda$; the monopole is mounted on a conductive bottom board. To house an antenna into an apparatus, it is necessary to make the antenna compact. An inverted F antenna is known as such an antenna. The inverted F antenna has the distal end of the pole bent to become shorter, and has a short-circuited portion provided near the power supply node to achieve impedance matching.

It is also known that using a plurality of antennae provides the diversity effect. For example, there is a proposal on a computer device having a plurality of inverted F antenna buried in a unit (see, for example, Japanese Patent Application Laid-Open No. 2006-325178).

In case of a notebook computer with a clam shell structure in which a cover including a display panel is mounted on the computer body including a keyboard in an openable and closable manner, the antennae are preferably disposed at the distal end of the cover to provide high reception sensitivity. To provide the diversity effect, it is preferable to set the distance between two antennae as long as possible (see FIG. 19).

Since the inverted F antenna can be designed compact and short, this antenna can be laid out as shown in FIG. 19. However, the inverted F antenna undesirably has a narrow fractional bandwidth. The inverted F antenna is widely used in the IEEE 802.11 wireless LAN in the band of 2.4 to 2.5 GHz (see, for example, Japanese Patent Application Laid-Open No. 2009-44604), but has a difficulty in covering up to the 2.5 to 2.7 GHz WiMAX.

FIG. 20 exemplifies the S11 characteristics (return loss or reflection coefficient) of an inverted F antenna according to a related art. The normal specifications on the S11 characteristics expect that the S11 parameter is less than −10 dB. When the inverted F antenna is used in the bandwidth of 2.4 to 2.7 GHz which is the bandwidth of the WiMAX added to the bandwidth of the wireless LAN, the edge of the frequency illustrated in FIG. 20 is the limit.

Those two wireless communication capabilities can be achieved by providing another antenna for the 2.5 to 2.7 GHz WiMAX in addition to the antenna for the 2.4 to 2.5 GHz wireless LAN. However, the use of 2-system antenna increases the antenna mounting area. In addition, the increase in the number of antennae increases the connections to a signal processing circuit, thus making the internal configuration of the antennae-mounted apparatus complex.

In short, while antennae are preferably separated as far as possible to provide the good diversity effect (it is ideal to dispose antennae at the horizontal ends of the cover in the example illustrated in FIG. 19), this layout becomes the bottleneck in designing the apparatus and interferes with the compact design thereof.

SUMMARY

It is desirable to provide an excellent antenna device and communication device which have a plurality of antennae to bring about the diversity effect or the like to achieve broad-banding, and are used by being incorporated in an apparatus including a notebook computer and a mobile terminal.

It is also desirable to provide a compact antenna device and communication device excellent in sufficiently providing the diversity effect and covering a broad-band area.

According to an embodiment of the present disclosure, there is provided an antenna device including a first antenna including a first power supply section, a first short-circuited section connected to a bottom board, and a first open-circuited section, and a second antenna including a second power supply section separated from the first power supply section by an electric path length of about $n\lambda/4$, a second short-circuited section connected to the bottom board, and a second open-circuited section.

According to an embodiment of the present disclosure, the second power supply section may be separated from the first power supply section in a range of $\lambda/4 \times 0.75$ corresponding to a high frequency end of a target frequency bandwidth to $\lambda/4 \times 1.25$ corresponding to a low frequency end of the target frequency bandwidth.

According to an embodiment of the present disclosure, each of the first antenna and the second antenna may include a conductive pattern formed on a dielectric substrate.

According to an embodiment of the present disclosure, each of the first open-circuited section and the second open-circuited section may include a line with a folded shape.

According to an embodiment of the present disclosure, the bottom board may have a slot between the first power supply section and the second power supply section, and the first power supply section and the second power supply section may be separated from each other by an electric path length of about $\lambda/4$, the electric path bypassing the slot.

According to an embodiment of the present disclosure, the first short-circuited section and the second short-circuited section may be directly connected to the bottom board.

According to an embodiment of the present disclosure, each of the first short-circuited section and the second short-circuited section may be connected to the bottom board via an LC circuit element.

According to an embodiment of the present disclosure, each of the first short-circuited section and the second short-circuited section may be connected to the bottom board via a pattern circuit.

According to an embodiment of the present disclosure, the first short-circuited section and the second short-circuited section may be disposed to face each other, and the first open-circuited section and the second open-circuited section are disposed back to back.

According to an embodiment of the present disclosure, there is provided a communication device including the antenna device according to the embodiment of the present disclosure and a signal processing section that processes a communication signal to be transmitted or received via the antenna device.

According to an embodiment of the present disclosure, the signal processing section may perform diversity transmission and reception using the first antenna and the second antenna.

According to an embodiment of the present disclosure, the signal processing section may perform spatial multiplexing and separation on a signal to be transmitted or received via the first antenna and the second antenna.

According to the present disclosure, it is possible to provide a compact antenna device and communication device excellent in sufficiently providing the diversity effect and covering a broad-band area.

According to the present disclosure, a single antenna device can cover a broad-band area of, for example, the wireless LAN plus WiMAX. Therefore, the antenna mounting area can be suppressed to make the antenna device compact as compared to a case where an antenna device is provided for each wireless communication capability. In addition, the sufficiency of a single antenna device prevents the number of connections to a signal processing circuit from increasing, thus simplifying the apparatus.

In short, the present disclosure can achieve broad-banding while suppressing the number of antennae, and thus brings about advantages of compactness of the apparatus, enhanced convenience, and improvement on the design.

Other needs, features and advantages of embodiments of the present disclosure will be readily apparent from the detailed descriptions of preferred embodiments with reference to the accompanying drawings.

DETAILED DESCRIPTION OF THE EMBODIMENT(S)

Figure 1:
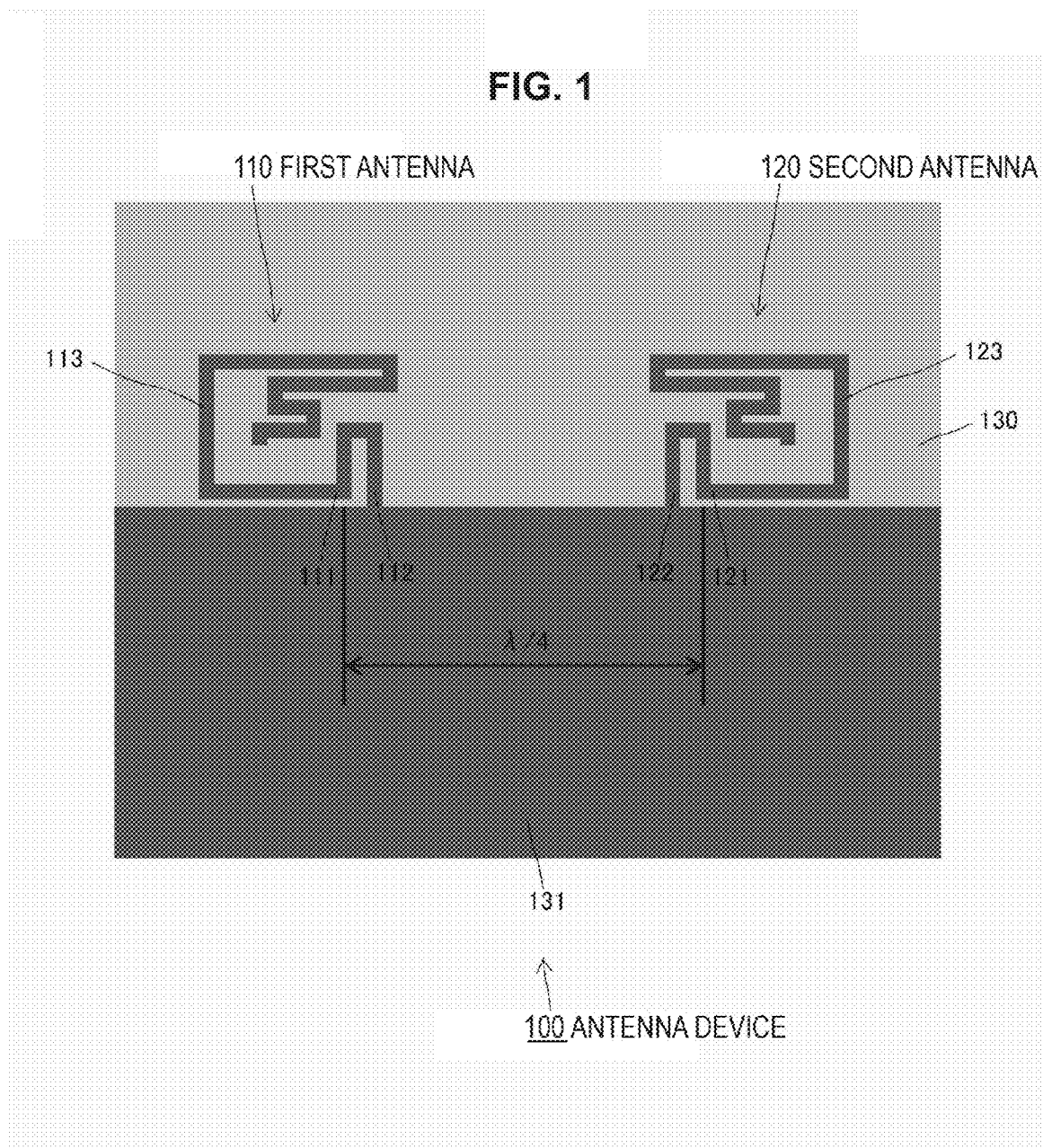
FIG. 1 is a diagram showing the configuration of an antenna device 100 according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Referring to the accompanying drawings, preferred embodiments of the present disclosure are described below in detail.

First Embodiment

FIG. 1 shows the configuration of an antenna device 100 according to an embodiment of the present disclosure.

The antenna device 100 includes a first antenna 110 and a second antenna 120 to form a diversity antenna. In the illustrated example, each of the antennae 110 and 120 has a conductive pattern formed on a dielectric substrate 130.

The first antenna 110 includes a power supply section 111, a short-circuited line 112, and an open-circuited line 113.

The short-circuited line 112 is a line extending from the power supply section 111. In the illustrated example, the short-circuited line 112 which has substantially a U shape is short-circuited at an end to a bottom board 131 formed on the dielectric substrate 130.

The open-circuited line 113 is a line extending from the power supply section 111 in the opposite direction to the short-circuited line 112. The open-circuited line 113 has a length of, for example, a quarter of the wavelength λ, and causes the first antenna 110 to operate as an inverted F antenna. In the illustrated example, the open-circuited line 113 has a multi-folded shape to reduce the mounting area of the conductive pattern.

The second antenna 120 includes a power supply section 121, a short-circuited line 122, and an open-circuited line 123.

The short-circuited line 122 is a line extending from the power supply section 121. In the illustrated example, the short-circuited line 122 which has substantially a U shape is short-circuited at an end to the bottom board 131 formed on the dielectric substrate 130.

The open-circuited line 123 is a line extending from the power supply section 121 in the opposite direction to the short-circuited line 122. The open-circuited line 123 has a length of, for example, a quarter of the wavelength λ, and causes the second antenna 120 to operate as an inverted F antenna. In the illustrated example, the open-circuited line 123 has a multi-folded shape to reduce the mounting area of the conductive pattern.

Although the open-circuited line 113 of the first antenna 110 and the open-circuited line 123 of the second antenna 120 are illustrated horizontally symmetrical to each other, both open-circuited lines should not necessarily have the same folded shape.

In the illustrated example shown in FIG. 1, the first antenna 110 and the second antenna 120 are disposed in such a way that the short-circuited line 112 of the first antenna 110 and the short-circuited line 122 of the second antenna 120 face each other, and the open-circuited line 113 of the first antenna 110 and the open-circuited line 123 of the second antenna 120 are arranged back to back. A feature of an embodiment of the present disclosure lies in that the distance between the power supply section 111 of the first antenna 110 and the power supply section 121 of the second antenna 120 (more strictly, "current path length") is set to about λ/4. Accordingly, the effect of coupling between the two antennae 110 and 120 adjusts the impedance to widen the bandwidth.

Figure 2:
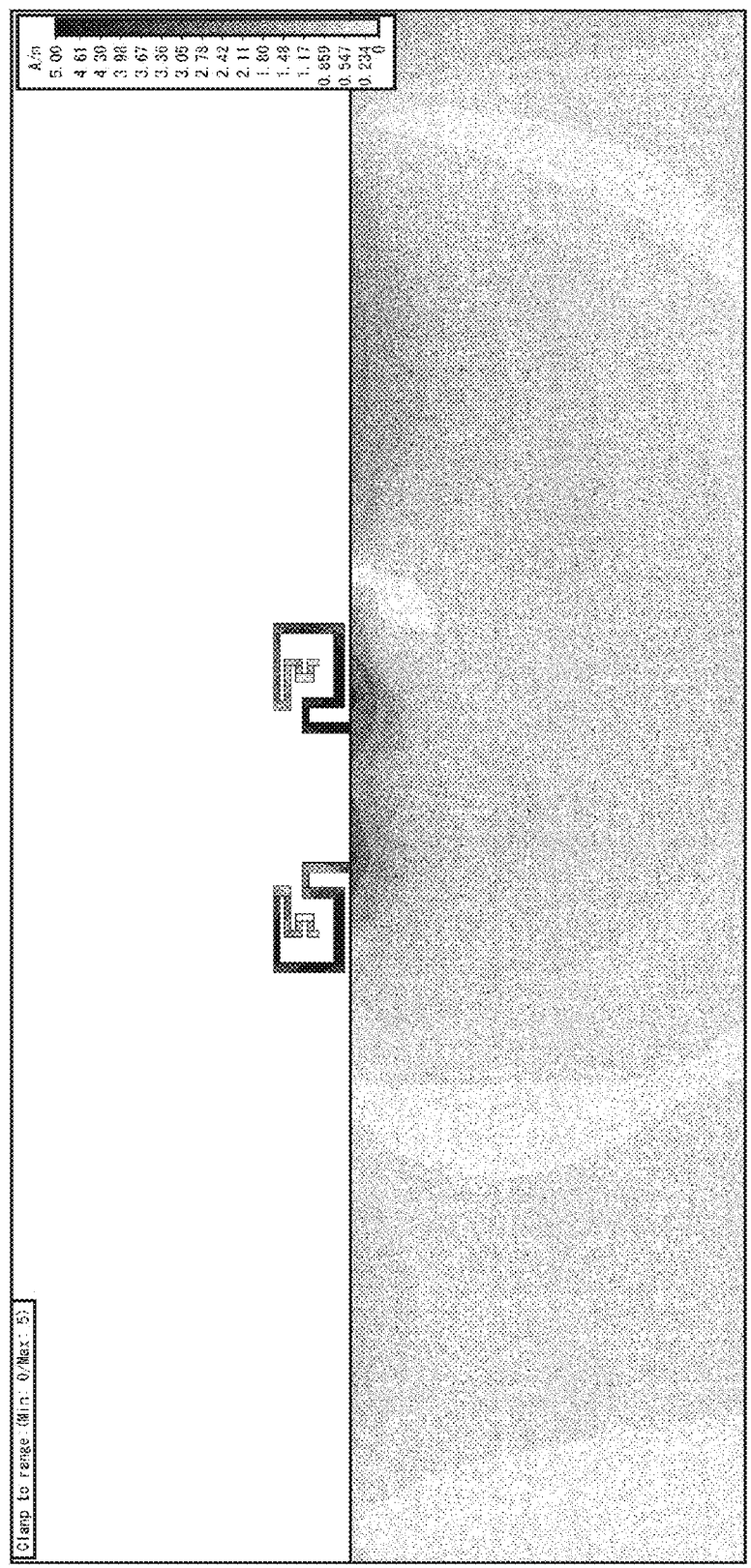
FIG. 2 is a diagram showing the simulation results of the current distribution occurring in the antenna device 100.

FIG. 2 shows the simulation results of the current distribution that occurs in the antenna device 100 when the distance between the power supply section 111 of the first antenna 110 and the power supply section 121 of the second antenna 120 is set to about λ/4. (Corrections are being made to FIG. 2 so that a color change from red to yellow to blue is changed to gray scale.) FIG. 2 shows that setting the distance between the power supply section 111 of the first antenna 110 and the power supply section 121 of the second antenna 120 to about λ/4 causes the GND current to be distributed at the short-circuited portions of the short-circuited lines 112 and 122 of the antennae 110 and 120.

Figure 3:
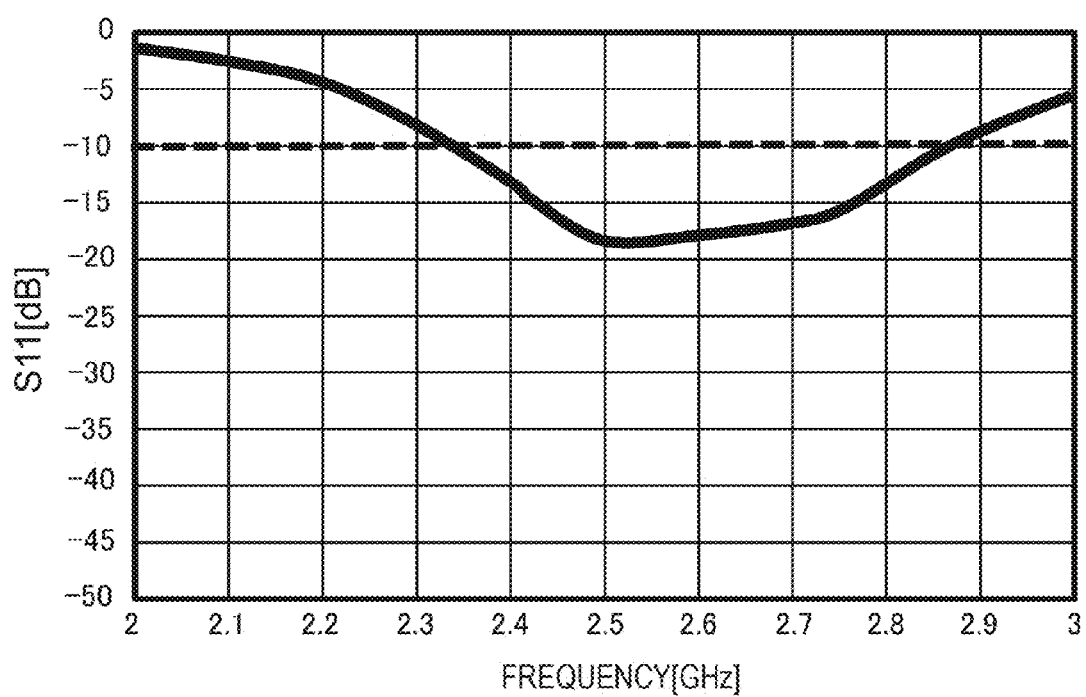
FIG. 3 is a diagram showing the S11 characteristics of the antenna device 100.
Figure 20:
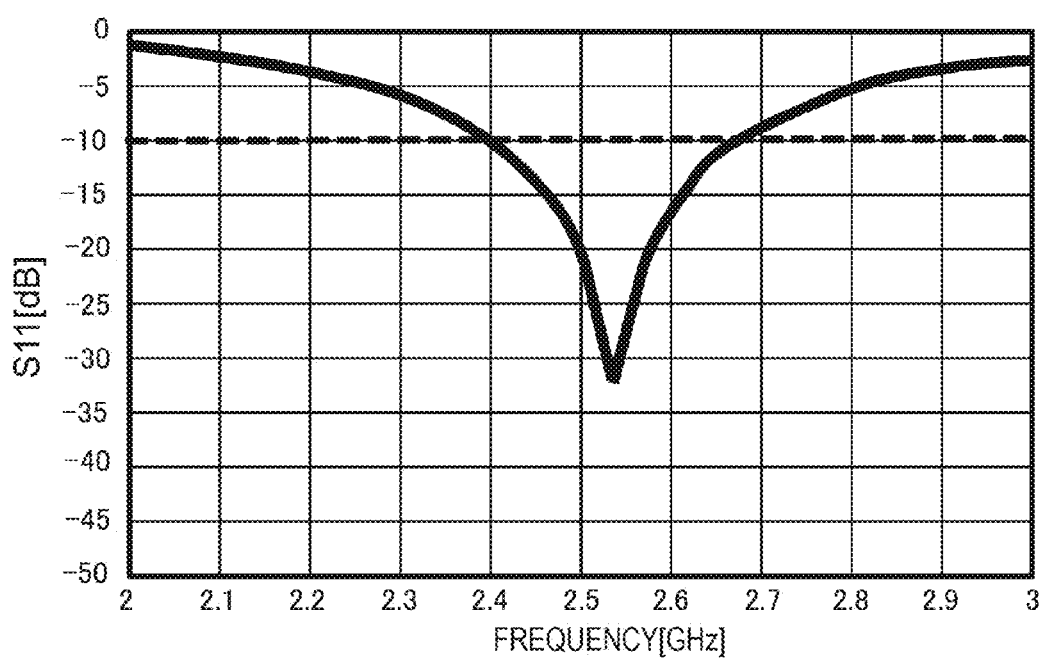
FIG. 20 is a diagram showing the S11 characteristics of an inverted F antenna according to a related art.

FIG. 3 shows the S11 characteristics (return loss or reflection coefficient) of the antenna device 100. FIG. 3 shows that the antenna device 100 provides a large bandwidth where the S11 parameter is less than −10 dB as expected by the normal specifications on the S11 characteristics, as compared to the case illustrated in FIG. 20. The antenna device 100 can therefore be used adequately in the bandwidth of 2.4 to 2.7 GHz which is the bandwidth of the WiMAX added to the bandwidth of the wireless LAN.

The distance between the power supply section 111 of the first antenna 110 and the power supply section 121 of the second antenna 120 being "about λ/4" specifically means that when the distance lies within a range of λ/4×0.75 corresponding to the high frequency end of the target frequency bandwidth to λ/4×1.25 corresponding to the low frequency end of the target frequency bandwidth, the effect of the above-mentioned broad-banding is achieved. In consideration of a case where the dielectric substrate 130 (or the casing of the apparatus on which the antenna device 100 is mounted) has an effect of shortening the wavelength, "about λ/4" may be expressed as a range of $\lambda/4 \times 0.75 \times 1/\sqrt{\in_r}$ corresponding to the high frequency end of the target frequency bandwidth to $\lambda/4 \times 1.25 \times 1/\sqrt{\in_r}$ corresponding to the low frequency end of the target frequency bandwidth (where $\in_r$ is the dielectric constant of the dielectric substrate 130 (or the casing of the apparatus having the antenna device 100 mounted thereon)).

The distance between the power supply section 111 of the first antenna 110 and the power supply section 121 of the second antenna 120 may be an integer multiple of λ/4, or nλ/4 (n being a positive integer), not λ/4. It is to be noted that in consideration of making the antenna device 100 compact, the adequate value is n=1 or λ/4.

Figure 4:
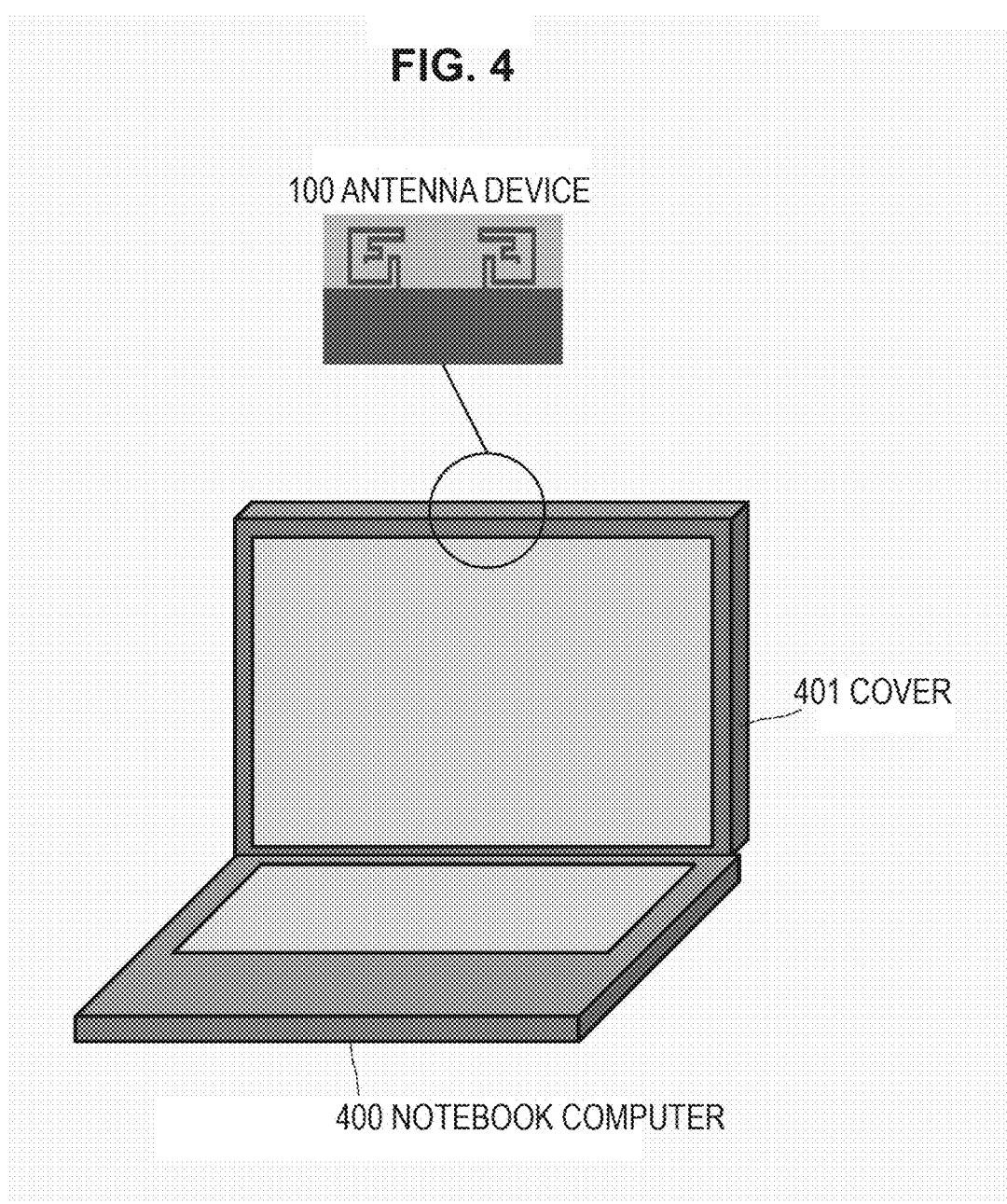
FIG. 4 is a diagram showing the antenna device 100 mounted on a notebook computer 400.
Figure 19:
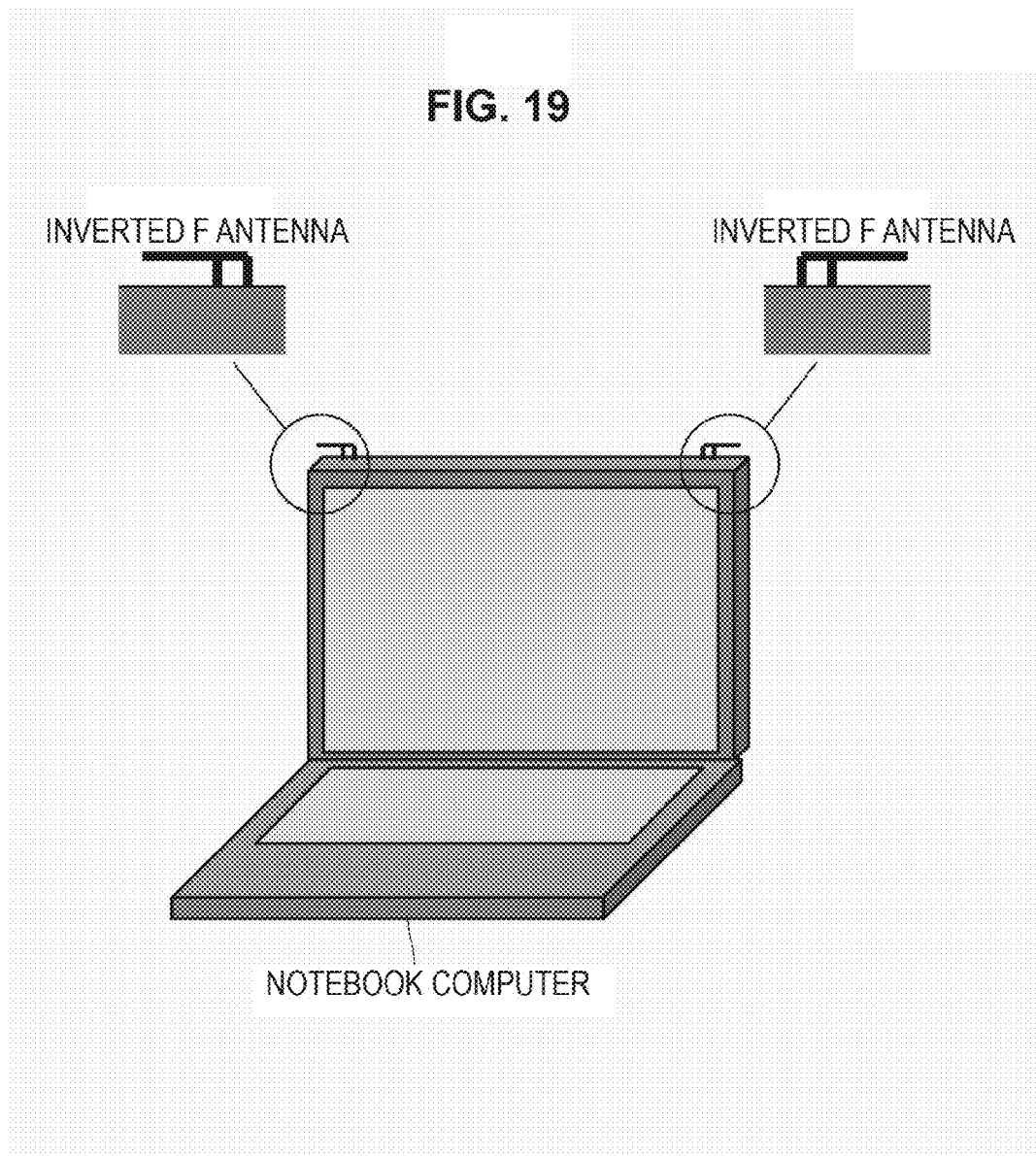
FIG. 19 is a diagram showing a diversity antenna mounted on a notebook computer with a clam shell structure.

FIG. 4 shows the antenna device 100 mounted on a notebook computer 400. In the illustrated example, the antenna device 100 is mounted at the distal end of a cover 401 of the notebook computer 400 having a clam shell structure substantially in a center thereof. Because the compact configuration where the distance between the first antenna 110 and the second antenna 120 is λ/4, it is sufficient to provide the antenna device 100 at a single location. Of course, the antenna device 100 may be provided on a right end or a left end, not in the center of the distal end of the cover 401. The design of the apparatus becomes flexible as compared to the case of FIG. 19 where a large distance is set between the two antennae.

In the example shown in FIG. 1, the first antenna 110 and the second antenna 120 are disposed in such a way that the short-circuited line 112 of the first antenna 110 and the short-circuited line 122 of the second antenna 120 face each other, and the open-circuited line 113 of the first antenna 110 and the open-circuited line 123 of the second antenna 120 are arranged back to back. If the condition that the distance between the power supply section 111 of the first antenna 110 and the power supply section 121 of the second antenna 120 is set to nλ/4 is fulfilled, as shown in FIG. 15, the antennae 110 and 120 may be disposed in such a way that the open-circuited lines 113 and 123 of the antennae 110 and 120 face each other, and the short-circuited lines 112 and 122 of the antennae 110 and 120 are arranged back to back.

Figure 15:
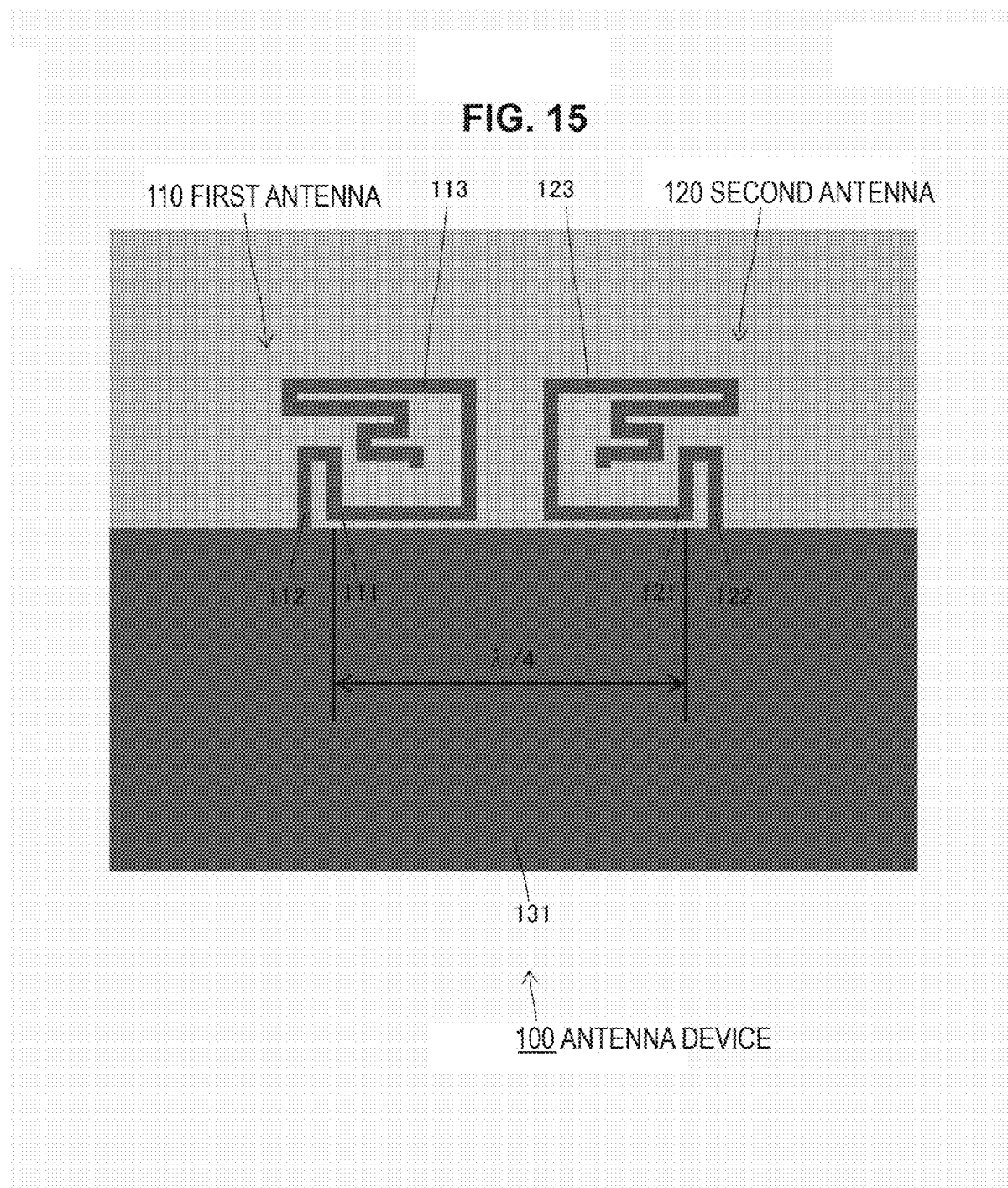
FIG. 15 is a diagram showing a modification example of the antenna device 100 in which an open-circuited line 113 of a first antenna 110 and an open-circuited line 123 of a second antenna 120 are disposed to face each other, and a short-circuited line 112 of the first antenna 110 and a short-circuited line 122 of the second antenna 120 are disposed back to back.
Figure 16:
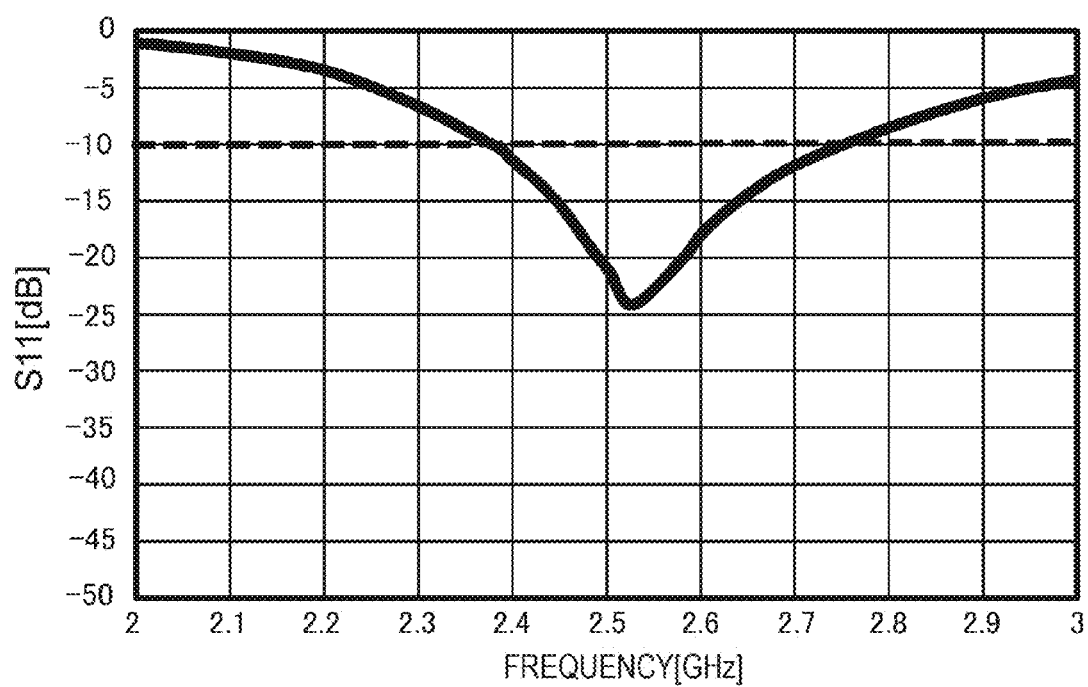
FIG. 16 is a diagram showing the S11 characteristics of the antenna device shown in FIG. 15.

FIG. 16 shows the S11 characteristics (return loss or reflection coefficient) of the antenna device shown in FIG. 15. FIG. 16 shows that even when the open-circuited lines 113 and 123 of the antennae 110 and 120 face each other, and the short-circuited lines 112 and 122 of the antennae 110 and 120 are arranged back to back, the antenna device provides a large bandwidth where the S11 parameter is less than −10 dB as expected by the normal specifications on the S11 characteristics. Therefore, the antenna device 100 can be used adequately in the bandwidth of 2.4 to 2.7 GHz which is the bandwidth of the WiMAX added to the bandwidth of the wireless LAN.

Second Embodiment

Figure 5:
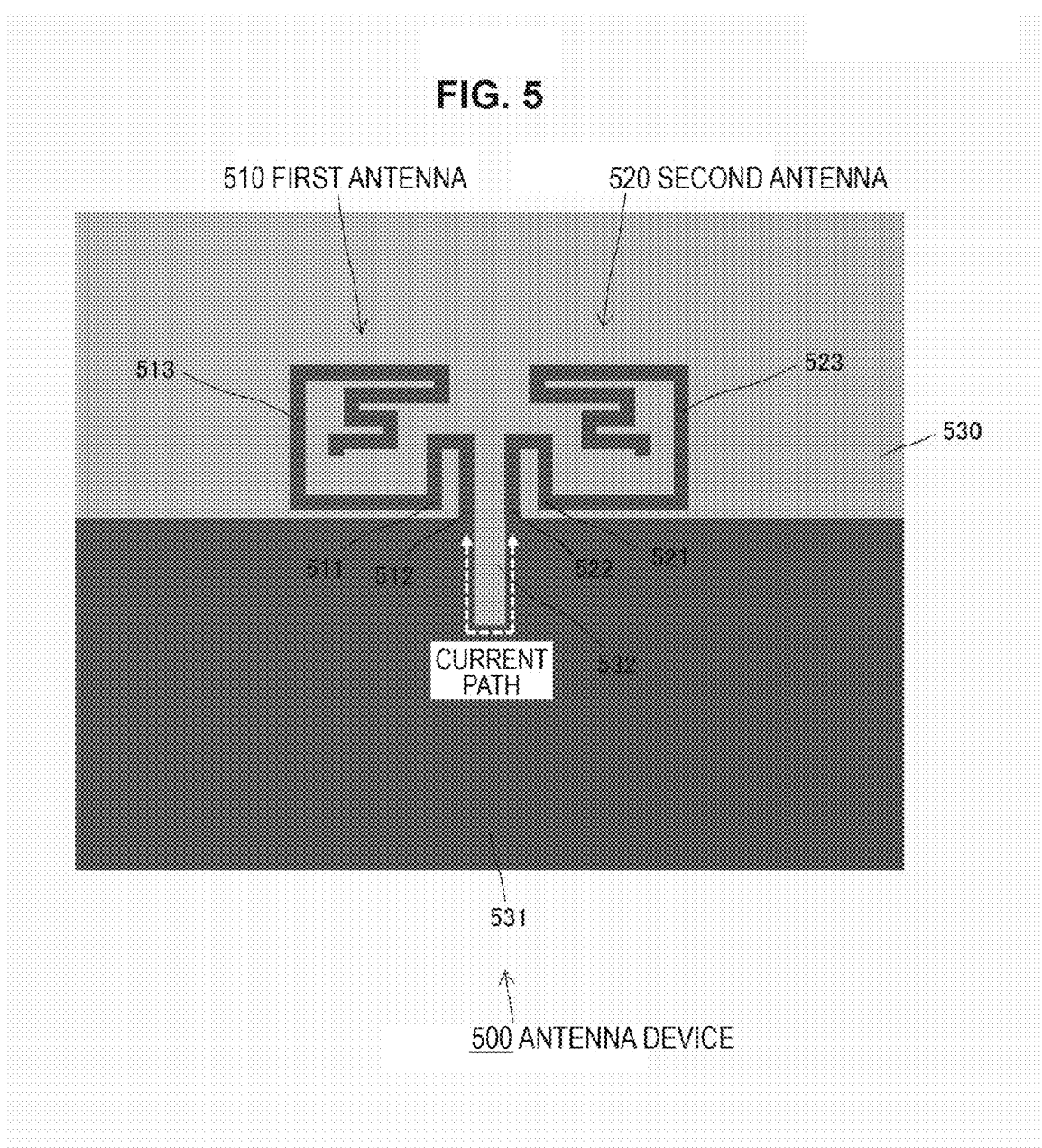
FIG. 5 is a diagram showing the configuration of an antenna device 500 according to another embodiment of the present disclosure.

FIG. 5 shows the configuration of an antenna device 500 according to another embodiment of the present disclosure.

The antenna device 500 includes a first antenna 510 and a second antenna 520 to form a diversity antenna. In the illustrated example, each of the antennae 510 and 520 has a conductive pattern formed on a dielectric substrate 530.

The first antenna 510 includes a power supply section 511, a short-circuited line 512, and an open-circuited line 513. The short-circuited line 512 is a line extending from the power supply section 511. In the illustrated example, the short-circuited line 512 which has substantially a U shape is short-circuited at an end to a bottom board 531 formed on the dielectric substrate 530. The open-circuited line 513 is a line extending from the power supply section 511 in the opposite direction to the short-circuited line 512. The open-circuited line 513 has a multi-folded shape (the same as the one mentioned above).

The second antenna 520 includes a power supply section 521, a short-circuited line 522, and an open-circuited line 523, and has a conductive pattern shaped to be substantially horizontally symmetrical to the first antenna 510. It is to be noted that the open-circuited lines 513 and 523 should not necessarily have the same folded shape.

In the example shown in FIG. 5, the first antenna 510 and the second antenna 520 are disposed in such a way that the short-circuited line 512 of the first antenna 510 and the short-circuited line 522 of the second antenna 520 face each other, and the open-circuited line 513 of the first antenna 510 and the open-circuited line 523 of the second antenna 520 are arranged back to back. A feature of the antenna device 500 lies in that a slot (cut portion) 532 is formed in the bottom board 531 between the short-circuited line 512 of the first antenna 510 and the short-circuited line 522 of the second antenna 520, so that the current path length by which the power supply sections 511 and 521 are coupled together via the bottom board 531 bypasses the slot 532 to be about $\lambda/4$. The slot 532 is cut in the bottom board 531 substantially linearly in the vertical direction (or the height direction of the antennae 510 and 520) in FIG. 5. Accordingly, as with in the case shown in FIG. 1 where the distance between the power supply sections 511 and 521 is set to about $\lambda/4$, the effect of coupling between the two antennae 510 and 520 adjusts the impedance to widen the bandwidth. In addition, the presence of the slot 532 can permit the antennae 510 and 520 to be arranged closer to each other in such a way that the distance between the power supply sections 511 and 521 is set shorter than $\lambda/4$. This makes it possible to make the antenna device 500 more compact than the antenna device 100 shown in FIG. 1.

Figure 6:
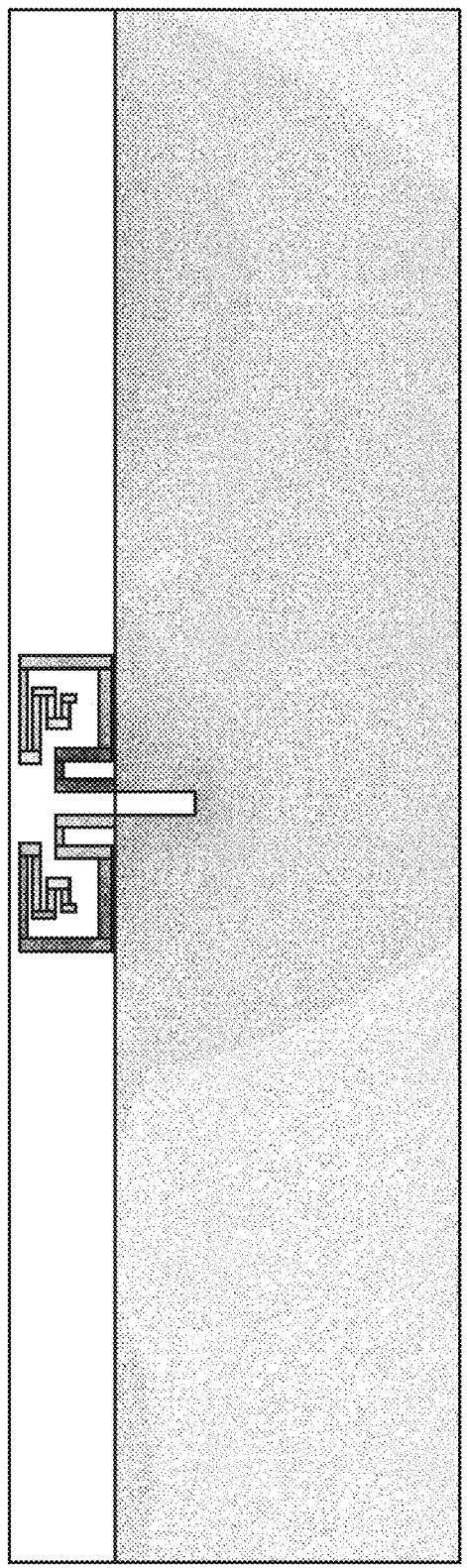
FIG. 6 is a diagram showing the simulation results of the current distribution occurring in the antenna device 500.

FIG. 6 shows the simulation results of the current distribution that occurs in the antenna device 500. (Corrections are being made to FIG. 6 so that a color change from red to yellow to blue is changed to gray scale.) FIG. 6 shows that although the distance between the power supply section 511 of the first antenna 510 and the power supply section 521 of the second antenna 520 is shorter than $\lambda/4$, the formation of the slot 532 sets the current path length to be about $\lambda/4$, causing the GND current to be distributed at the short-circuited portions of the short-circuited lines 512 and 522 of the antennae 510 and 520.

Figure 7:
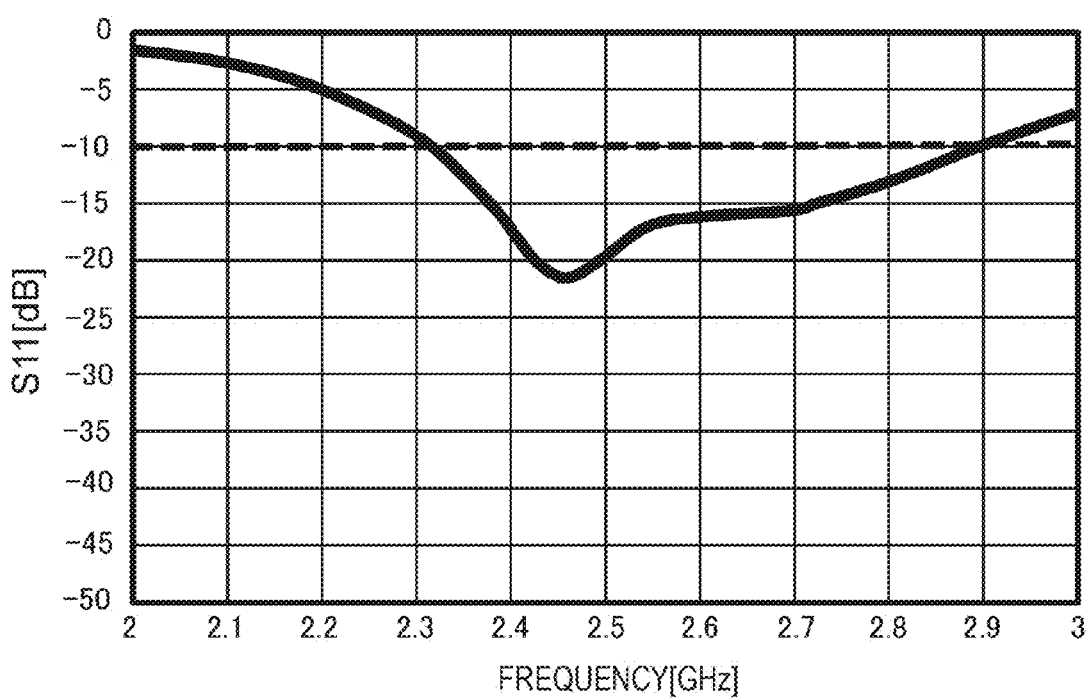
FIG. 7 is a diagram showing the S11 characteristics of the antenna device 500.

FIG. 7 shows the S11 characteristics (return loss or reflection coefficient) of the antenna device 500. FIG. 7 shows that even when the antenna device 500 is made more compact by forming the slot 532, it is possible to provide a large bandwidth where the S11 parameter is less than −10 dB as expected by the normal specifications on the S11 characteristics. The antenna device 500 can therefore be used adequately in the bandwidth of 2.4 to 2.7 GHz which is the bandwidth of the WiMAX added to the bandwidth of the wireless LAN.

Third Embodiment

Figure 8:
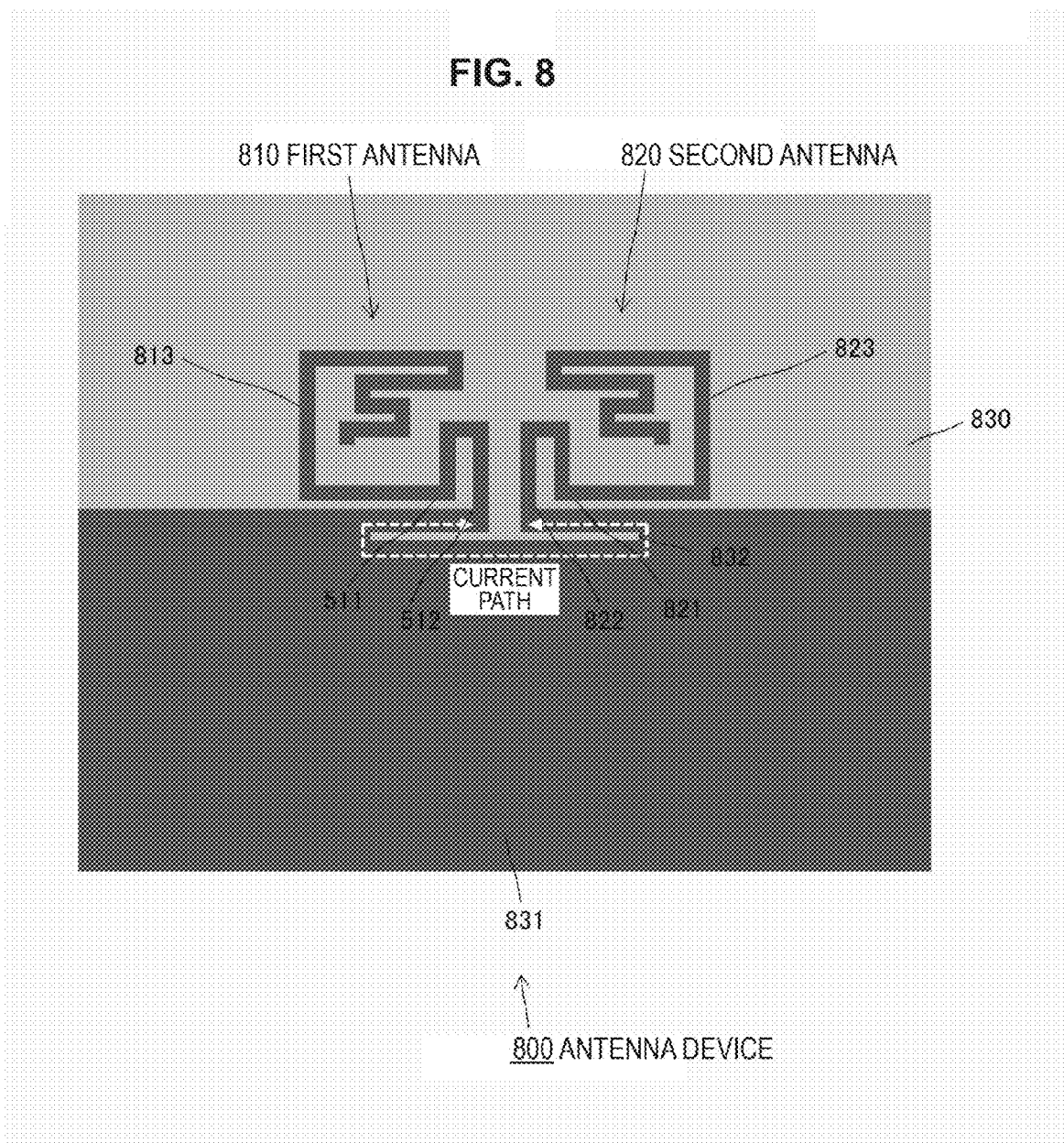
FIG. 8 is a diagram showing the configuration of an antenna device 800 according to a further embodiment of the present disclosure.

FIG. 8 shows the configuration of an antenna device 800 according to a further embodiment of the present disclosure.

The antenna device 800 includes a first antenna 810 and a second antenna 820 to form a diversity antenna. In the illustrated example, each of the antennae 810 and 820 has a conductive pattern formed on a dielectric substrate 830.

The first antenna 810 includes a power supply section 811, a short-circuited line 812, and an open-circuited line 813. The short-circuited line 812 is a line extending from the power supply section 811. In the illustrated example, the short-circuited line 812 which has substantially a U shape is short-circuited at an end to a bottom board 831 formed on the dielectric substrate 830. The open-circuited line 813 is a line extending from the power supply section 811 in the opposite direction to the short-circuited line 812. The open-circuited line 813 has a multi-folded shape (the same as the one mentioned above).

The second antenna 820 includes a power supply section 821, a short-circuited line 822, and an open-circuited line 823, and has a conductive pattern shaped to be substantially horizontally symmetrical to the first antenna 810. It is to be noted that the open-circuited lines 813 and 823 should not necessarily have the same folded shape.

In the example shown in FIG. 8, the first antenna 810 and the second antenna 820 are disposed in such a way that the short-circuited line 812 of the first antenna 810 and the short-circuited line 822 of the second antenna 820 face each other, and the open-circuited line 813 of the first antenna 810 and the open-circuited line 823 of the second antenna 820 are arranged back to back. Also in the antenna device 800, a slot (cut portion) 832 is formed in the bottom board 831 between the short-circuited line 812 of the first antenna 810 and the short-circuited line 822 of the second antenna 820. The slot 832 is cut in the bottom board 831 substantially linearly in the horizontal direction (or the layout direction of the antennae 810 and 820) in FIG. 8. Because of the slot 832, the current path length by which the power supply sections 811 and 821 are coupled together via the bottom board 831 bypasses the slot 832 to be about $\lambda/4$, the effect of coupling between the two antennae 810 and 820 adjusts the impedance to widen the bandwidth. The presence of the slot 832 can permit the antennae 810 and 820 to be arranged closer to each other in such a way that the distance between the power supply sections 811 and 821 is set shorter than $\lambda/4$. This makes it possible to make the antenna device 800 more compact. Further, because the slot 832 is horizontally elongated, it is possible to reduce the vertical size of the antenna device 800 to make the antenna device 800 shorter than the antenna device 500.

Figure 9:
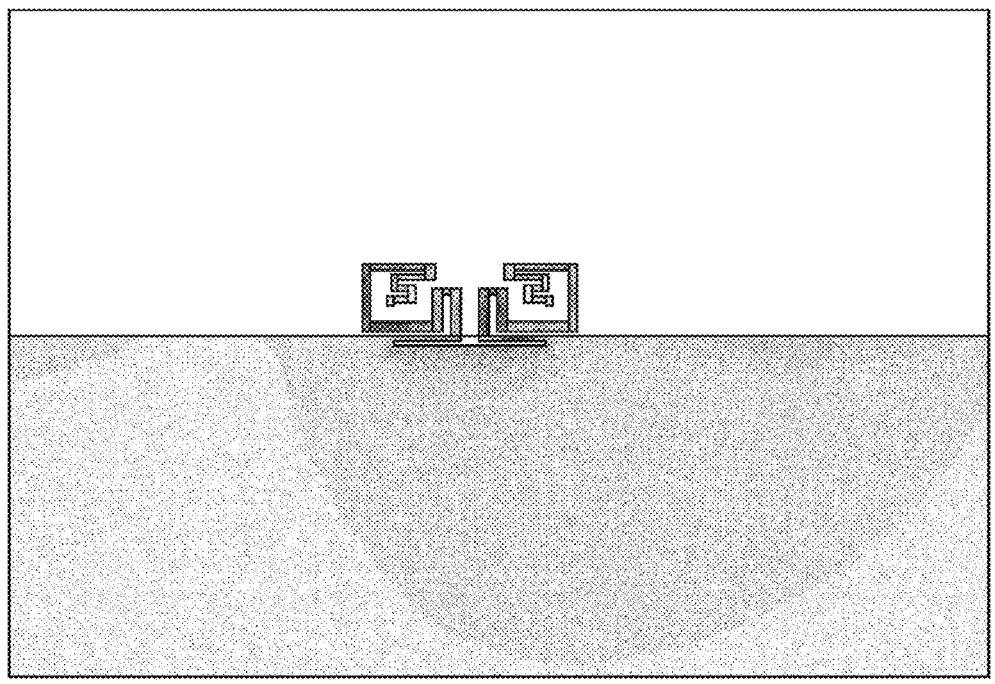
FIG. 9 is a diagram showing the simulation results of the current distribution occurring in the antenna device 800.

FIG. 9 shows the simulation results of the current distribution that occurs in the antenna device 800. (Corrections are being made to FIG. 9 so that a color change from red to yellow to blue is changed to gray scale.) FIG. 9 shows that although the distance between the power supply section 811 of the first antenna 810 and the power supply section 821 of the second antenna 820 is shorter than $\lambda/4$, the formation of the slot 832 sets the current path length to be about $\lambda/4$, causing the GND current to be distributed at the short-circuited portions of the short-circuited lines 812 and 822 of the antennae 810 and 820.

Figure 10:
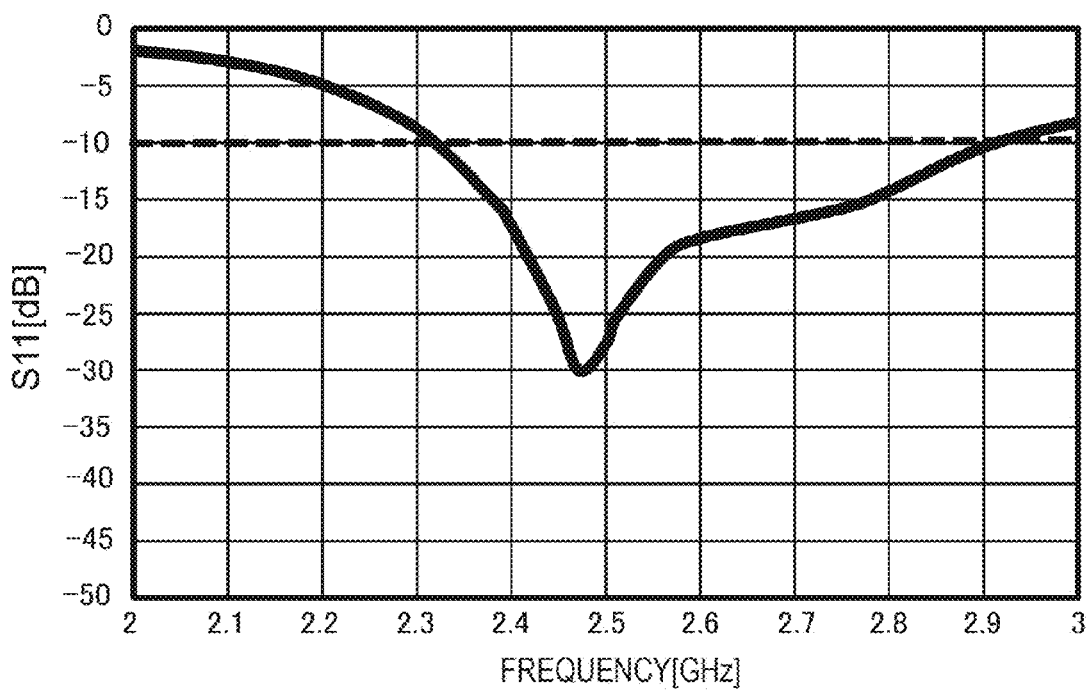
FIG. 10 is a diagram showing the S11 characteristics of the antenna device 800.

FIG. 10 shows the S11 characteristics (return loss or reflection coefficient) of the antenna device 800. FIG. 10 shows that even when the antenna device 800 is made more compact and shorter by forming the horizontally elongated slot 832, it is possible to provide a large bandwidth where the S11 parameter is less than −10 dB as expected by the normal specifications on the S11 characteristics. The antenna device 800 can therefore be used adequately in the bandwidth of 2.4 to 2.7 GHz which is the bandwidth of the WiMAX added to the bandwidth of the wireless LAN.

Fourth Embodiment

Figure 11:
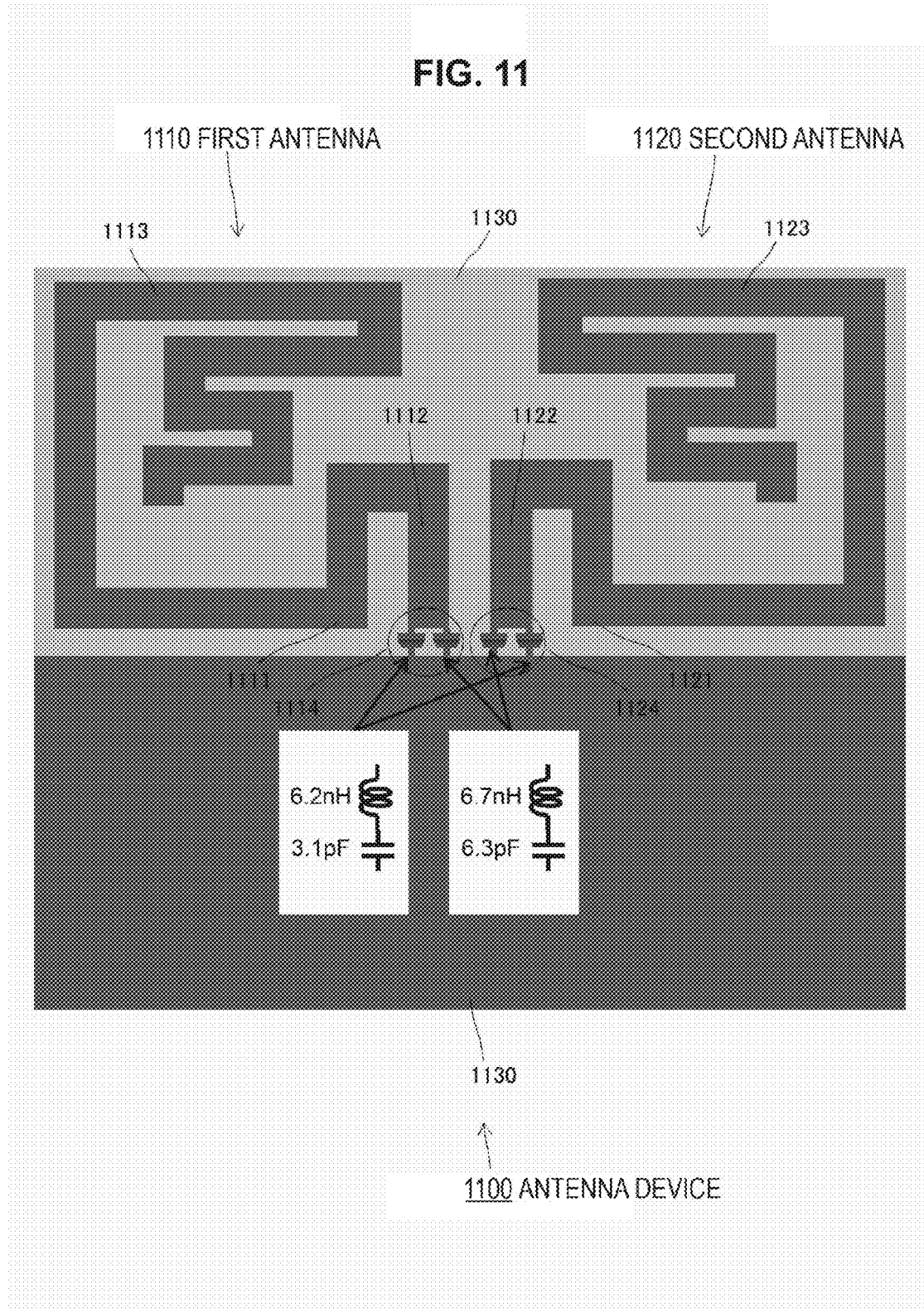
FIG. 11 is a diagram showing the configuration of an antenna device 1100 according to a still further embodiment of the present disclosure.

FIG. 11 shows the configuration of an antenna device 1100 according to a still further embodiment of the present disclosure.

The antenna device 1100 includes a first antenna 1110 and a second antenna 1120 to form a diversity antenna. In the illustrated example, each of the antennae 1110 and 1120 has a conductive pattern formed on a dielectric substrate 1130.

The first antenna 1110 includes a power supply section 1111, a short-circuited line 1112, an open-circuited line 1113, and an LC circuit section 1114. The short-circuited line 1112 is a line extending from the power supply section 1111 (the same as the one mentioned above). The short-circuited line 1112 is connected via the LC circuit section 1114, at an end, to a bottom board 1131 formed on the dielectric substrate 1130. The open-circuited line 1113 is a line extending from the power supply section 1111 in the opposite direction to the short-circuited line 1112. The open-circuited line 1113 has a multi-folded shape (the same as the one mentioned above).

The second antenna 1120 includes a power supply section 1121, a short-circuited line 1122, an open-circuited line 1123, and an LC circuit section 1124, and has a conductive pattern shaped to be substantially horizontally symmetrical to the first antenna 1110. It is to be noted that the open-circuited lines 1113 and 1123 should not necessarily have the same folded shape.

The first antenna 1110 and the second antenna 1120 are disposed in such a way that the short-circuited line 1112 of the first antenna 1110 and the short-circuited line 1122 of the second antenna 1120 face each other, and the open-circuited line 1113 of the first antenna 1110 and the open-circuited line 1123 of the second antenna 1120 are arranged back to back. The example shown in FIG. 11 differs from an ordinary inverted F antenna in that the ends of the short-circuited lines 1112 and 1122 of the antennae 1110 and 1120 are not short-circuited to the bottom board 1131 directly, but via the LC circuit sections 1114 and 1124, respectively.

As shown in FIG. 11, for example, each of the LC circuit sections 1114 and 1124 includes a parallel circuit of a series circuit of an inductor of 6.2 nH and a capacitor of 3.1 pF and a series circuit of an inductor of 6.7 nH and a capacitor of 6.3 pF. The interposing of the LC circuit sections 1114 and 1124 between the ends of the short-circuited lines 1112 and 1122 of the antennae 1110 and 1120 and the bottom board 1131 can provide the same effect of coupling between the antennae 1110 and 1120 as provided when the power supply sections 1111 and 1121 are separated by the current path length of λ/4. That is, arranging the antennae 1110 and 1120 closer to each other in such a way that the distance between the power supply sections 1111 and 1121 is set shorter than λ/4 makes the antenna device 1100 more compact.

Figure 12:
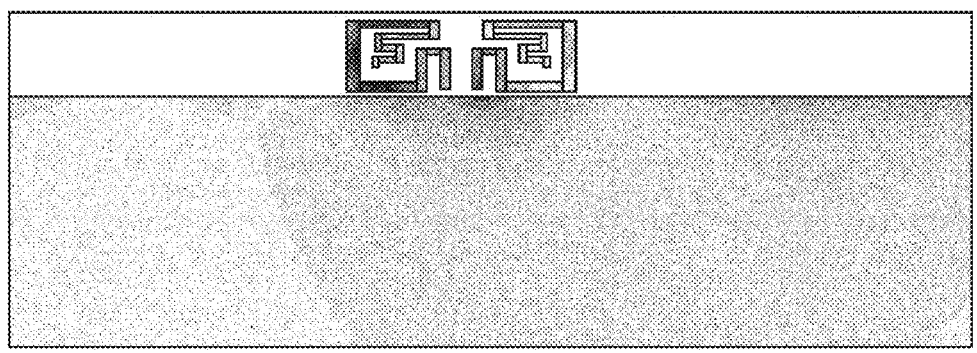
FIG. 12 is a diagram showing the simulation results of the current distribution occurring in the antenna device 1100.

FIG. 12 shows the simulation results of the current distribution that occurs in the antenna device 1100. (Corrections are being made to FIG. 12 so that a color change from red to yellow to blue is changed to gray scale.) FIG. 12 shows that although the distance between the power supply section 1111 of the first antenna 1110 and the power supply section 1121 of the second antenna 1120 is shorter than λ/4, the interposing of the LC circuit sections 1114 and 1124 sets the current path length to be about λ/4, thus causing the GND current to be distributed at the short-circuited portions of the short-circuited lines 1112 and 1122 of the antennae 1110 and 1120.

Figure 13:
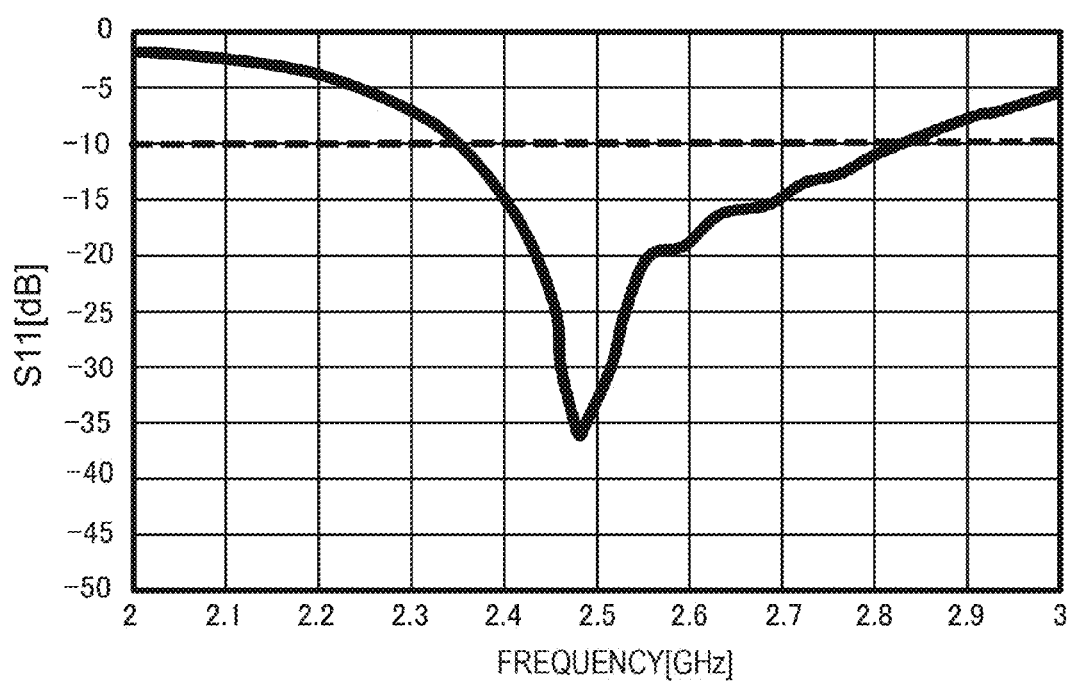
FIG. 13 is a diagram showing the S11 characteristics of the antenna device 1100.

FIG. 13 shows the S11 characteristics (return loss or reflection coefficient) of the antenna device 1100. FIG. 13 shows that even when the LC circuit sections 1114 and 1124 are interposed at the short-circuited portions of the short-circuited lines 1112 and 1122 of the antennae 1110 and 1120, and the antenna device 1100 is made compact, it is possible to provide a large bandwidth where the S11 parameter is less than −10 dB as expected by the normal specifications on the S11 characteristics. The antenna device 1100 can therefore be used adequately in the bandwidth of 2.4 to 2.7 GHz which is the bandwidth of the WiMAX added to the bandwidth of the wireless LAN.

It is common to interpose a matching circuit in the power supply section of an inverted F antenna. The configuration example shown in FIG. 11 differs from such an inverted F antenna in that an LC circuit is interposed in the short-circuited portion of each of the short-circuited lines 1112 and 1122, not in the power supply section 1111.

Figure 14:
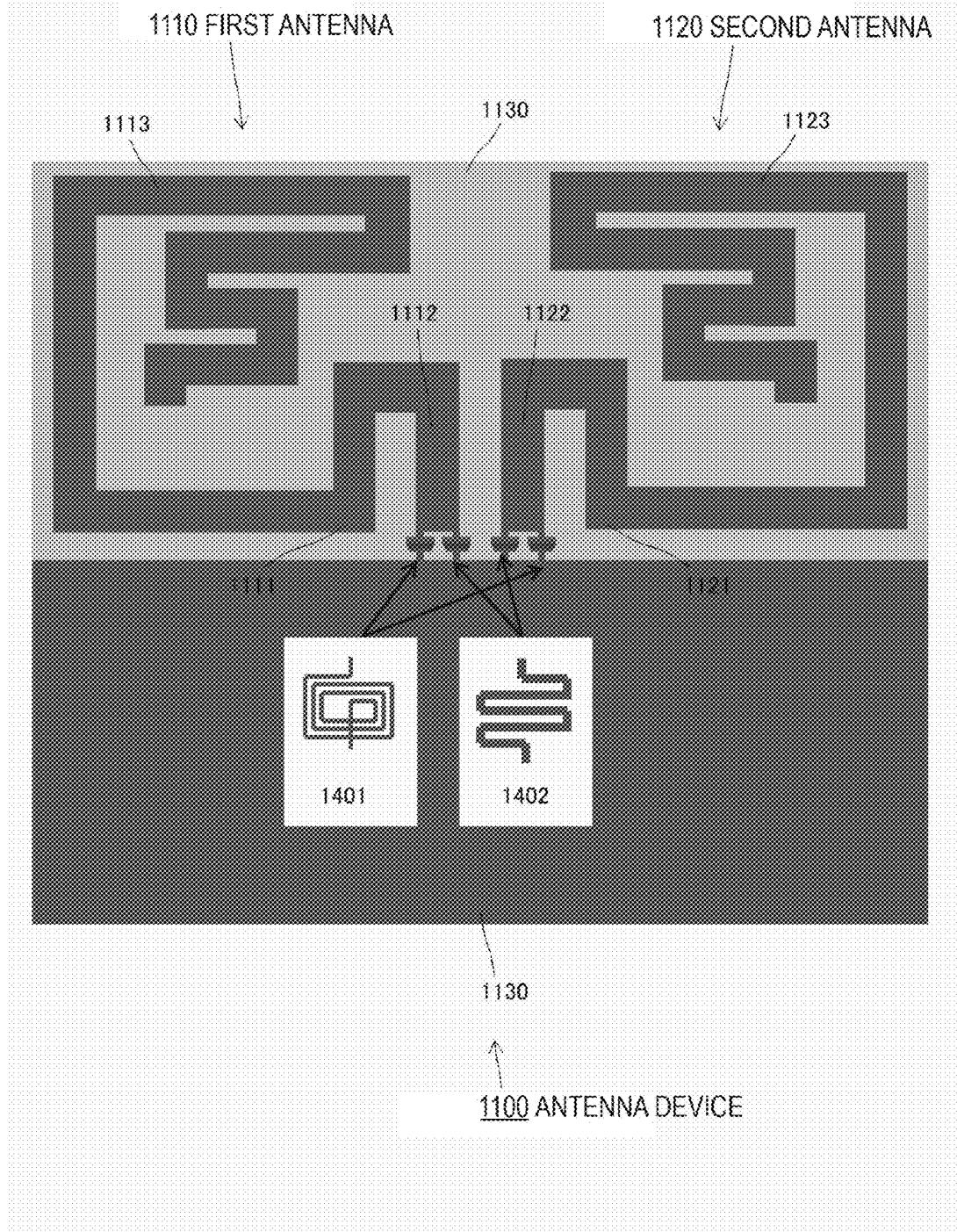
FIG. 14 is a diagram showing a modification example of the antenna device 1100.

FIG. 14 shows a modification example of the antenna device 1100 shown in FIG. 11. Inserting a spiral pattern circuit 1401 and a meander pattern circuit 1402 in the short-circuited portions of the short-circuited lines 1112 and 1122 of the antennae 1110 and 1120, in place of the circuit elements such as the inductor and coil, as shown in FIG. 14, can likewise achieve broad-banding and compact design.

Fifth Embodiment

Figure 17:
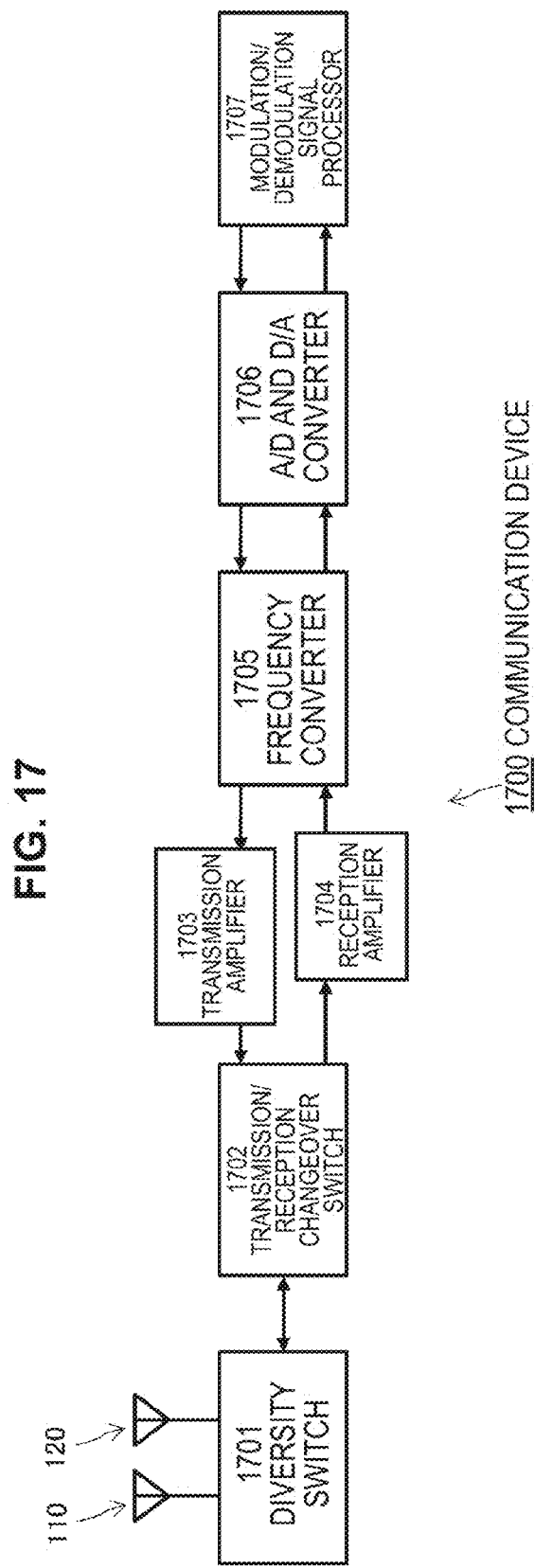
FIG. 17 is a diagram showing a configuration example of a diversity type communication device 1700.

FIG. 17 shows a configuration example of a diversity type communication device 1700 configured by using the antenna device according to any one of the first to fourth embodiments. For the sake of descriptive convenience, it is assumed hereinbelow that the antenna device 100 according to the first embodiment is used.

A diversity switch (SW) 1701 switches between the first antenna 110 and the second antenna 120 for diversity transmission and reception.

A transmission/reception changeover switch (SW) 1702 connects the diversity antenna to a transmission amplifier 1703 at the time of transmission, and to a reception amplifier 1704 at the time of reception.

The transmission amplifier 1703 performs power amplification on a transmission RF signal. The reception amplifier 1704 performs low noise amplification on a reception RF signal.

A frequency converter 1705 up-converts a transmission signal to have an RF band wavelength, and down-converts the reception RF signal.

An A/D and D/A converter 1706 converts a transmission digital signal to an analog signal, and converts a received analog signal to a digital signal.

A modulation/demodulation signal processor 1707 performs coding and modulation on transmission data, and performs demodulation and decoding on a received signal.

As described above, the antenna device 100 provides a large bandwidth where the S11 parameter is less than −10 dB as expected by the normal specifications on the S11 characteristics, so that even with this 1-system antenna, the communication device 1700 can cover the WiMAX in addition to the wireless LAN.

Sixth Embodiment

Figure 18:
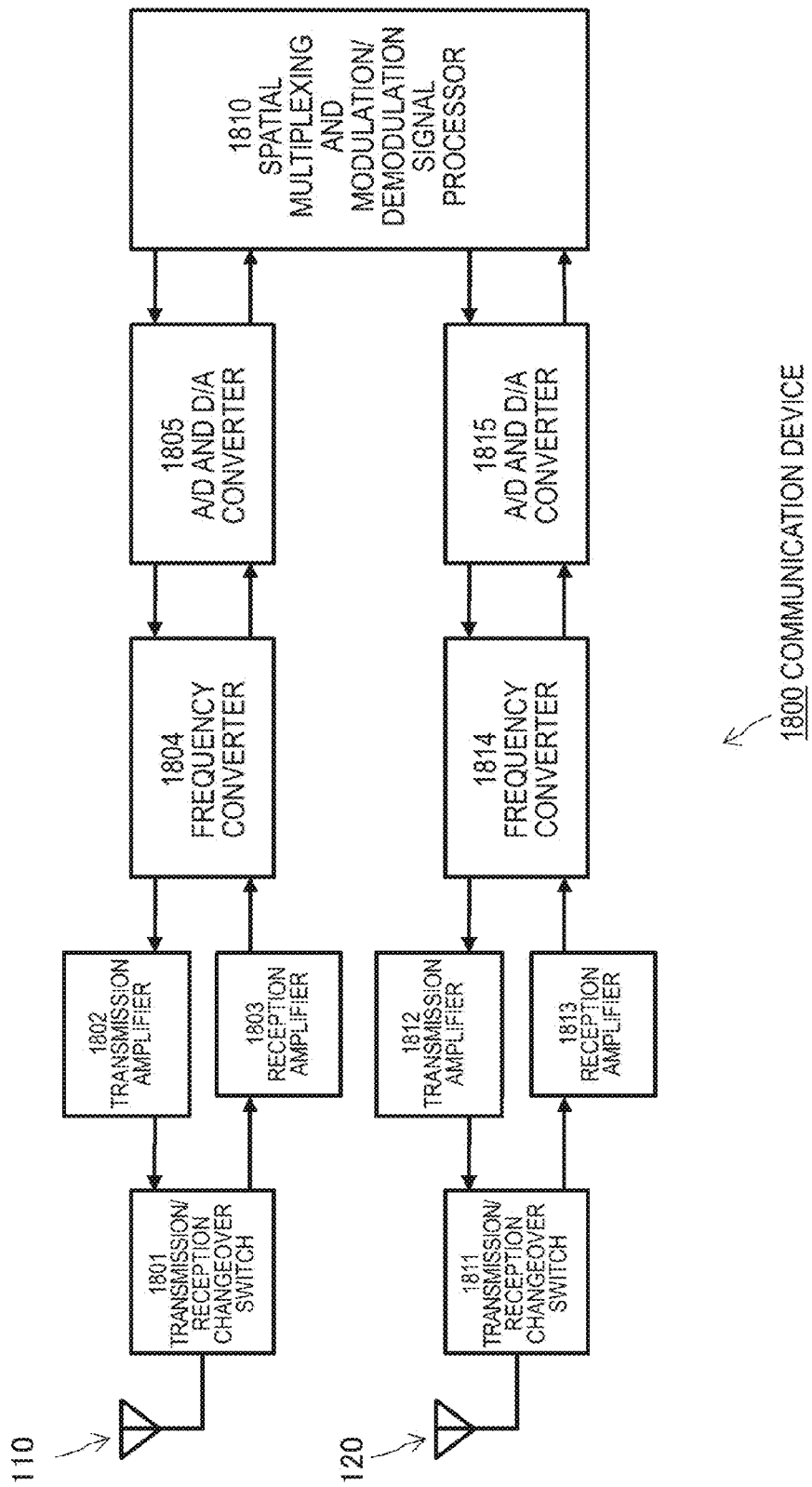
FIG. 18 is a diagram showing a configuration example of an MIMO (Multiple Input Multiple Output) type communication device 1800.

FIG. 18 shows a configuration example of an MIMO type communication device 1800 which is configured by using the antenna device according to any one of the first to fourth embodiments. MIMO is the communication protocol that uses a plurality of antennae to achieve spatial multiplexing of a plurality of communication streams to increase the transmission capacity (see, for example, Japanese Patent Publication No. 4039413). For the sake of descriptive convenience, it is assumed hereinbelow that the antenna device 100 according to the first embodiment is used.

A communication device 1800 is configured to include a transmission/reception branch for each of the first antenna 110 and the second antenna 120.

A transmission/reception changeover switch 1801 connects the first antenna 110 to a transmission amplifier 1802 at the time of transmission, and to a reception amplifier 1803 at the time of reception.

The transmission amplifier 1802 performs power amplification on a transmission RF signal. The reception amplifier 1803 performs low noise amplification on a reception RF signal. A frequency converter 1804 up-converts a transmission signal to have an RF band wavelength, and down-converts the reception RF signal. An A/D and D/A converter 1805 converts a transmission digital signal to an analog signal, and converts a received analog signal to a digital signal.

A transmission/reception changeover switch 1811 connects the second antenna 120 to a transmission amplifier 1812 at the time of transmission, and to a reception amplifier 1813 at the time of reception.

The transmission amplifier 1812 performs power amplification on a transmission RF signal. The reception amplifier 1813 performs low noise amplification on a reception RF signal. A frequency converter 1814 up-converts a transmission signal to have an RF band wavelength, and down-converts the reception RF signal. An A/D and D/A converter 1815 converts a transmission digital signal to an analog signal, and converts a received analog signal to a digital signal.

A spatial multiplexing and modulation/demodulation signal processor 1810 performs spatial multiplexing of a transmission stream for each branch, spatial separation of a received signal for each branch, and coding and decoding, modulation and demodulation on a transmission/reception stream.

As described above, the antenna device 100 provides a large bandwidth where the S11 parameter is less than −10 dB as expected by the normal specifications on the S11 characteristics, so that even with this 1-system antenna, the communication device 1800 can cover the WiMAX in addition to the wireless LAN.

Additionally, the present technology may also be configured as below.
(1) An antenna device including:
 a first antenna including a first power supply section, a first short-circuited section connected to a bottom board, and a first open-circuited section; and
 a second antenna including a second power supply section separated from the first power supply section by an electric path length of about nλ/4, a second short-circuited section connected to the bottom board, and a second open-circuited section.
(2) The antenna device according to (1),
 wherein the second power supply section is separated from the first power supply section in a range of λ/4×0.75 corresponding to a high frequency end of a target frequency bandwidth to λ/4×1.25 corresponding to a low frequency end of the target frequency bandwidth.
(3) The antenna device according to (1),
 wherein each of the first antenna and the second antenna includes a conductive pattern formed on a dielectric substrate.
(4) The antenna device according to (3),
 wherein each of the first open-circuited section and the second open-circuited section includes a line with a folded shape.
(5) The antenna device according to (3),
 wherein the bottom board has a slot between the first power supply section and the second power supply section, and
 wherein the first power supply section and the second power supply section are separated from each other by an electric path length of about λ/4, the electric path bypassing the slot.
(6) The antenna device according to (3),
 wherein the first short-circuited section and the second short-circuited section are directly connected to the bottom board.
(7) The antenna device according to (3),
 wherein each of the first short-circuited section and the second short-circuited section is connected to the bottom board via an LC circuit element.
(8) The antenna device according to (3),
 wherein each of the first short-circuited section and the second short-circuited section is connected to the bottom board via a pattern circuit.
(9) The antenna device according to (3),
 wherein the first short-circuited section and the second short-circuited section are disposed to face each other, and the first open-circuited section and the second open-circuited section are disposed back to back.
(10) A communication device including:
 the antenna device according to (1); and
 a signal processing section that processes a communication signal to be transmitted or received via the antenna device.
(11) The communication device according to (10),
 wherein the signal processing section performs diversity transmission and reception using the first antenna and the second antenna.
(12) The communication device according to (10),
 wherein the signal processing section performs spatial multiplexing and separation on a signal to be transmitted or received via the first antenna and the second antenna.

The present disclosure has been described in detail by way of specific embodiments. However, it is obvious for those skilled in the art to modify the embodiments and use substitute components without departing from the subject matter of the present disclosure.

Although the above description has been centered on the embodiments that permit a single antenna device to cover a broad band including the 2.4-2.5 GHz bandwidth of the wireless LAN and the 2.5-2.7 GHz bandwidth of the WiMAX, the subject matter of the present disclosure is not limited to such embodiments. For example, adapting the present disclosure can permit a telephone antenna with an 800-MHz/900-MHz band to be shared with a system with a 700-MHz band (for example, super Wi-Fi).

Although the present disclosure has been described by way of examples, the present disclosure should not be interpreted in a limited sense. The following claims should be considered in determining the subject matter of the present disclosure.

What is claimed is:

1. An antenna device, comprising:
 a first antenna that comprises:
  a first power supply section,
  a first short-circuited section connected to a bottom board, and
  a first open-circuited section; and
 a second antenna that comprises:
  a second power supply section separated from the first power supply section by an electric path length in a range of $n\lambda/4 \times 0.75$ to $n\lambda/4 \times 1.25$,
  a second short-circuited section connected to the bottom board, and
  a second open-circuited section,
  wherein n is a positive integer,
  wherein each of the first short-circuited section and the second short-circuited section is connected to the bottom board via a circuit section,
  wherein the circuit section comprises a spiral pattern circuit in parallel with a meander pattern circuit.

2. The antenna device according to claim 1,
 wherein the second power supply section is separated from the first power supply section in a range of $\lambda/4 \times 0.75$ to $\lambda/4 \times 1.25$,
 wherein $\lambda/4 \times 0.75$ corresponds to a high frequency end of a target frequency bandwidth, and
 wherein $\lambda/4 \times 1.25$ corresponds to a low frequency end of the target frequency bandwidth.

3. The antenna device according to claim 1, wherein each of the first antenna and the second antenna includes a conductive pattern on a dielectric substrate.

4. The antenna device according to claim 3, wherein each of the first open-circuited section and the second open-circuited section includes a line with a folded shape.

5. The antenna device according to claim 3,
 wherein the first short-circuited section faces the second short-circuited section, and
 wherein the first open-circuited section and the second open-circuited section are arranged back to back.

6. The antenna device according to claim 1, wherein the first open-circuited section has a first multi-folded shape and the second open-circuited section has a second multi-folded shape different from the first multi-folded shape.

7. A communication device, comprising:
 an antenna device that comprises:
  a first antenna that comprises:
   a first power supply section,
   a first short-circuited section connected to a bottom board, and
   a first open-circuited section; and
  a second antenna that comprises:
   a second power supply section separated from the first power supply section by an electric path length in a range of $n\lambda/4 \times 0.75$ to $n\lambda/4 \times 1.25$,
   a second short-circuited section connected to the bottom board, and
   a second open-circuited section,
   wherein n is a positive integer,
   wherein each of the first short-circuited section and the second short-circuited section is connected to the bottom board via a circuit section,
   wherein the circuit section comprises a spiral pattern circuit in parallel with a meander pattern circuit; and
 a signal processing section configured to process a communication signal transmitted or received via the antenna device.

8. The communication device according to claim 7, wherein the signal processing section is further configured to communicate, by diversity transmission and reception, via the first antenna and the second antenna.

9. The communication device according to claim 7, wherein the signal processing section is further configured to spatially multiplex and separate the communication signal transmitted or received via the first antenna and the second antenna.

* * * * *